(12) United States Patent
Jaeger

(10) Patent No.: US 8,006,359 B2
(45) Date of Patent: Aug. 30, 2011

(54) MACHINE TOOL FOR PROCESSING TOOTH FORMATIONS OF WORKPIECES

(75) Inventor: Helmut Jaeger, Koenigsbach-Stein (DE)

(73) Assignee: Felsomat GmbH & Co. KG, Koenigsbach-Stein (DE)

( * ) Notice: Subject to any disclaimer, the term of this patent is extended or adjusted under 35 U.S.C. 154(b) by 353 days.

(21) Appl. No.: 12/226,623

(22) PCT Filed: Dec. 8, 2006

(86) PCT No.: PCT/DE2006/002181
§ 371 (c)(1),
(2), (4) Date: Dec. 16, 2008

(87) PCT Pub. No.: WO2007/121694
PCT Pub. Date: Nov. 1, 2007

(65) Prior Publication Data
US 2009/0175696 A1 Jul. 9, 2009

(30) Foreign Application Priority Data
Apr. 24, 2006 (DE) .......................... 10 2006 019 325

(51) Int. Cl.
*B23F 23/08* (2006.01)
*B23Q 7/02* (2006.01)
(52) U.S. Cl. .................. 29/38 B; 29/56.5; 409/6; 409/8; 409/11; 409/55; 409/61
(58) Field of Classification Search .................. 29/38 B, 29/38 R, 563, 56.5; 409/6, 8–9, 11, 17, 37–38, 409/40, 42, 49–50, 55, 58, 60–61
See application file for complete search history.

(56) References Cited

U.S. PATENT DOCUMENTS

| 5,634,250 | A | 6/1997 | Mihailovic |
| 5,947,663 | A | 9/1999 | Egawa et al. |
| 7,179,025 | B2 * | 2/2007 | Kreh .............................. 409/26 |
| 7,624,505 | B2 * | 12/2009 | Jaeger et al. ............... 29/893.35 |
| 2004/0250394 | A1 * | 12/2004 | Bautz ........................... 29/38 B |

FOREIGN PATENT DOCUMENTS

DE 19907617 A1 * 8/2000

(Continued)

OTHER PUBLICATIONS

Dubbel, "Taschenbuch für den Maschinenbau". (14. Auflage, 1981, Seiten 1050-1052).

(Continued)

*Primary Examiner* — Erica E Cadugan
(74) *Attorney, Agent, or Firm* — Walter A. Hackler

(57) ABSTRACT

A machine tool for processing tooth formations of workpieces, includes a rotary holder which can be rotated about a main axis A, two workpiece spindles which are arranged on the rotary holder, with the workpiece spindles having spindle axes ($S_a$, $S_b$) which are orientated parallel with the main axis A, in particular with the workpiece spindles being arranged symmetrically about the main axis A, and a tool holder for a tool for processing a workpiece on one of the workpiece spindles, is characterized in that the main axis A of the rotary holder extends horizontally. With this machine tool, contamination of the rotary holder and tool spindles by removed chips can be reduced and the structural complexity for a relative feed movement of the tool with respect to the workpiece parallel with the spindle axes can be reduced.

12 Claims, 2 Drawing Sheets

FOREIGN PATENT DOCUMENTS

DE 699 01 004 T2 10/2002
GB 784958 10/1957

OTHER PUBLICATIONS

D.H. Bruins und Hans-Jürgen Dräger, "Werkzeuge und Werkzeugmaschinen für die spanende Metallbearbeitung" (Teil 3, Seiten 220-229), 1978.

Commerical publication, "Verzahnungszentrum KX3", of Kapp GmbH, DE, Dated Aug. 1997.

Commerical publication, "EMO Einladung" of Kapp GmbH, DE, invitation for commerical fair "EMO", Sep. 10-17, 1997.

* cited by examiner

Rotary holder 3 having a first stop and a second stop, a motorized drive, and motorized spindle drives, as well as a protective shield between the workpiece spindles, wherein the main axis a extends through the protectective shield.

Fig. 2

Control Processor for Programming the Counter- Holder 13

Fig. 3

MACHINE TOOL FOR PROCESSING TOOTH FORMATIONS OF WORKPIECES

The invention relates to a machine tool for processing tooth formations of workpieces which comprises a rotary holder which can be rotated about a main axis A, two workpiece spindles which are arranged on the rotary holder and a tool holder for a tool for processing a workpiece on one of the tool spindles. The workpiece spindles have spindle axes which are orientated parallel with the main axis A of the rotary holder and the tool spindles are arranged in particular symmetrically about the main axis A.

A machine tool of the "Maschine RZ 150" type from the company "Reishauer AG" is a known example of such a machine tool.

Machine tools of this type are used to process workpieces in machining production methods, in which shapes are formed in workpieces by removing chips. During the processing of tooth formations, a gear wheel is produced by machining regularly spaced tooth spaces in an outer surface of a workpiece to be processed. The production costs per workpiece and the efficiency of a machine tool are dependent on the surface performance, that is to say, the surface of a workpiece machined within a period of time, and the ratio between the production time and the non-production time. In this instance, the production time is the processing time per workpiece and the non-production time is the time taken to change workpieces.

The arrangement of the two workpiece spindles on the rotary holder serves to save non-production time in that the processing of a workpiece on one of the workpiece spindles is carried out in a processing position and the loading and unloading of a workpiece in/from the other workpiece spindle is carried out in a transfer position at the same time, whereby the total processing cycle and the cycle time are reduced. The two workpiece spindles change their positions by the rotary holder being rotated. A workpiece spindle is rotated or pivoted into a processing position and the other workpiece spindle is moved out of the processing position. Unbalanced movements of the workpiece spindles during position change are minimised by the workpiece spindles being arranged symmetrically with respect to the main axis A.

In the machine tool of Reishauer AG known from the prior art (see above), the main axis A and the spindle axes of the workpiece spindles arranged on the rotary holder are orientated in a vertical direction. In this arrangement, the chips which are removed during the processing of tooth formations of a workpiece fall onto the workpiece spindle therebelow and the rotary holder and, at that location, form clusters of chips which subsequently have to be removed in order to prevent contaminations and associated restrictions of the operation of the rotary holder and the spindle operations and the drives thereof. The known machine tool is further not well-suited to techniques for forming teeth which are distinguished by a feed movement of the tool extending parallel with the workpiece axis or the spindle axes, such as, for example, longitudinal or axial milling. In the known machine tool, such a parallel feed movement which is orientated parallel with the main axis A and consequently vertically, similarly to the spindle axes, requires vertical lifting of the tool holder and/or the workpiece spindles, which requires high structural complexity.

DE 102 56 222 A1 describes a gear hobbing machine for processing spiral bevel gears. A work wheel is arranged on a horizontally orientated workpiece spindle, with the workpiece spindle being arranged on a spindle carrier which can be rotated about a vertical axis of rotation (P). A tool spindle has a fixed pre-selectable angle of inclination κ with respect to an orientation axis (O) and can be rotated about a horizontal axis (T). The workpiece spindle and tool spindle can be displaced linearly relative to each other in three spatial directions.

SUMMARY OF THE INVENTION

An object of the invention is to reduce the contamination of the rotary holder and the tool spindles owing to chips which are removed during the processing of tooth formations of a workpiece in the machine tool and to reduce the structural complexity for a relative feed movement of the tool relative to the workpiece parallel with the spindle axes.

The object is achieved according to the invention in that the main axis A of the rotary holder extends horizontally.

In the machine tool according to the invention, the main axis A of the rotary holder and the spindle axes of the workpiece spindles arranged on the rotary holder are orientated at least substantially horizontally. This results in the advantage that, during the processing of a workpiece which is arranged, for example, clamped or gripped, on one of the workpiece spindles, chips which occur fall freely in a vertical direction owing to gravitational force and consequently do not fall onto the rotary holder. Chips which adhere to the workpiece spindle(s) are disengaged by the rotation of the workpiece spindle during the tooth formation processing or at least loosened to such an extent that the formation of clusters of chips is prevented. This results in the advantage that, in the machine tool according to the invention, it is substantially possible to dispense with additional devices and/or method steps for removing chips on the workpiece spindles and the rotary holder, whereby the processing cycle in the machine tool is further reduced and consequently the cycle rate is further increased.

In particular in the case of dry processing, heating of the machine bed or the rotary holder owing to hot chips thereon does not occur. Thermal expansion associated with heating and therefore production inaccuracy are effectively prevented.

The horizontal position of the workpiece spindles results in the additional advantage that a feed movement directed parallel with the spindle axes extends parallel with the main axis A and consequently horizontally, in other words a parallel feed movement can be brought about in the machine tool according to the invention without any vertical lifting movement. Within the context of the parallel feed, therefore, neither a massive workpiece spindle, or even the rotary holder, nor the tool holder which is also massive needs to be displaced counter to gravitational force. Instead, it is simply necessary to move, for example, the tool holder in a planar manner, which only requires friction forces to be overcome.

In a preferred construction of the machine tool according to the invention, the tool holder can be displaced along a horizontal axis X which extends perpendicularly relative to the main axis A and along a horizontal linear axis Y which extends parallel with the main axis A.

In this preferred construction, the tool holder can be moved or conveyed along the linear axis X towards a workpiece on the workpiece spindle which is located in a processing position. After a workpiece has finished being processed, at the end of a production time, the tool holder can be moved back out of its processing position again. Owing to the displaceability of the tool holder along the linear axis X, which is perpendicular relative to the spindle axis, it is possible to carry out machining methods with a tool held in the tool holder with a perpendicular feed movement such as, for example, dipping or radial methods. Methods with a parallel feed movement can be carried out owing to the displaceability of the tool holder along the linear axis Y which is parallel with the main axis A and the spindle axes by means of the machine tool according to the invention. Both linear axes X and Y extend horizontally so that, in order to displace the tool holder in those directions, only friction forces have to be overcome. In particular, displaceability of the tool holder is achieved along the workpiece or workpiece spindle axis without applying a lifting force. The installation costs of the machine tool and the production costs of a workpiece which is processed with the machine tool are reduced owing to that technical simplification of the construction.

In another preferred construction of the machine tool according to the invention, the tool holder is arranged on a rotating holder which can be rotated about a horizontal axis of rotation B which extends perpendicularly relative to the main axis A.

In this advantageous construction, the tool holder can be tilted or inclined, owing to the arrangement on the rotating holder, relative to the workpiece in a plane which extends perpendicularly relative to the axis of rotation B. This results in the advantage that toothed wheels having an oblique profile extent and worm gears can be produced by means of a tool which is positioned in an inclined manner.

The tool holder is further preferably arranged on a tool carriage, with the tool carriage being movable relative to the rotating holder along a linear axis C which is perpendicular relative to the axis of rotation B.

Such an additional direction of movement of the tool holder allows rapid changing of the active portion of the milling tool, in particular during rotation of the rotary holder as soon as an active portion of the tool has become blunt. Work can thereby be carried out with a milling tool for a longer time.

The machine tool is further in the form of a gear hobbing device, in particular having a gear hobbing head, a hobbing shaving device, in particular having a shaving wheel, or a grinding device.

Any number of teeth and profile modifications can be produced with the same tool on the workpiece by means of a machine tool configured for a gear hobbing method. Gear hobbing is suitable for preliminary and final processing of tooth formations, whereas hobbing shaving is used for final processing of workpieces, in particular toothed wheels, and grinding is used for final processing of hardened workpieces.

In a preferred construction of the machine tool according to the invention, the rotary holder is in the form of a cylinder, in particular with the workpiece spindles projecting out of the cylinder.

In a construction of the rotary holder as a preferably massive cylinder, vibrations of the tool spindles are minimised and consequently the production precision is increased. Arranging the workpiece spindles on an upper side of the cylinder affords the advantage that the workpiece spindles are secured in a plane which extends perpendicularly relative to the main axis A and protrude freely inside the machine tool so that chips fall freely at the workpiece spindles and the workpiece spindles can be loaded in a readily accessible manner.

In a preferred configuration of the machine tool according to the invention, the rotary holder has a first stop and a second stop, with a first workpiece spindle being at a processing position and a second workpiece spindle being at a transfer position at each stop.

In that configuration, the processing position in which a workpiece is processed on a workpiece spindle with a tool, and the transfer position, in which a workpiece spindle can have a workpiece loaded or unloaded, are fixed by the stops. Consequently, the workpiece spindles can be moved into the two positions simply by moving the rotary holder in rotation without it further being necessary to carry out measurements and/or adjustments.

In another preferred construction of the invention, a motorized drive is provided on the rotary holder.

The workpiece spindles arranged on the rotary holder can change between the processing position and the transfer position within a short space of time by means of the drive, whereby the processing cycle is further reduced. In the context of the invention, it is possible to carry out position changes of the workpiece spindles within one second or less. Together with the times for moving the tool in and out of 0.5 seconds or less for each operation, it is possible to achieve a cut-to-cut time of 2 seconds and less.

Furthermore, preferably motorized spindle drives are provided on the workpiece spindles.

The motor-driven workpiece spindles can be moved into the processing position in the driven state rotating about the spindle axis. The tool holder generally also has a motorized drive and the rotating tool engages with the rotating workpiece in a manner synchronised in terms of speed. The entire processing cycle which is composed of the processing time and a period of time for changing the position of the workpiece spindles is further reduced by changing the position of the workpiece spindles with the workpiece spindles being operative and with the tool being operative.

In another preferred construction of the invention, the machine tool has a counter-holder which faces a workpiece spindle in a processing position, in particular with the counter-holder being programmable by means of a control processor.

The workpiece spindle is stabilised by the counter-holder with respect to transverse forces which occur during the workpiece processing. The counter-holder is programmed in such a manner that it releases the workpiece spindle after processing for changing position.

In another preferred construction of the machine tool according to the invention, a protective shield is provided on the rotary holder between the workpiece spindles, in particular with the main axis A extending through the protective shield.

The rotary holder is subdivided by the protective shield into regions or portions each having a workpiece spindle. The protective shield which acts as a separating device prevents chips from being introduced from one region into another region so that mutual occurrences of contamination, in particular when a new workpiece is clamped, are prevented. In the case of workpiece spindles which are arranged symmetrically about the main axis, a symmetrical arrangement of the protective shield is advantageous, in particular through the main axis A in order to avoid unbalances during rotational movement of the rotary holder.

In another configuration, the machine tool according to the invention has a deburring device for processing a workpiece on a workpiece spindle which is at a transfer position.

A workpiece which is previously processed in the processing position can subsequently be processed, that is to say, deburred, by means of the deburring device before being unloaded at the transfer position. Cleaning of the workpiece may optionally also be carried out. Owing to the deburring device, it is possible to dispense with repeated clamping of the workpiece for a subsequent separate deburring operation.

The deburring device is further preferably provided on an outer surface of the rotary holder.

A spatial arrangement of the deburring device above and/or to the side of the workpiece spindle in the transfer position affords advantages with regard to handling the deburring device and structural complexity of the machine tool.

The machine tool preferably has a clamping device for loading and unloading a workpiece in/from a workpiece spindle, with the workpiece spindle being at a transfer position.

The clamping device can further reduce the time for loading and unloading the workpiece spindle. If the rotary holder, workpiece spindles, tool and/or the tool holder, and optionally the deburring device and the clamping device, are actuated together, the processing time and the position changing time, that is to say, the overall processing cycle, can be minimised.

BRIEF DESCRIPTION OF THE DRAWINGS

Further advantages of the invention will be appreciated from the Figure and the description of the drawing. The machine tool according to the invention is illustrated in one embodiment in the Figure of the drawing. The features shown in the Figure are purely schematic and should not be understood to be true to scale.

FIG. 2 schematically shows features of the rotary holder.

FIG. 3 schematically shows a control processor for programming the counter holder.

DETAILED DESCRIPTION

Figure 1:
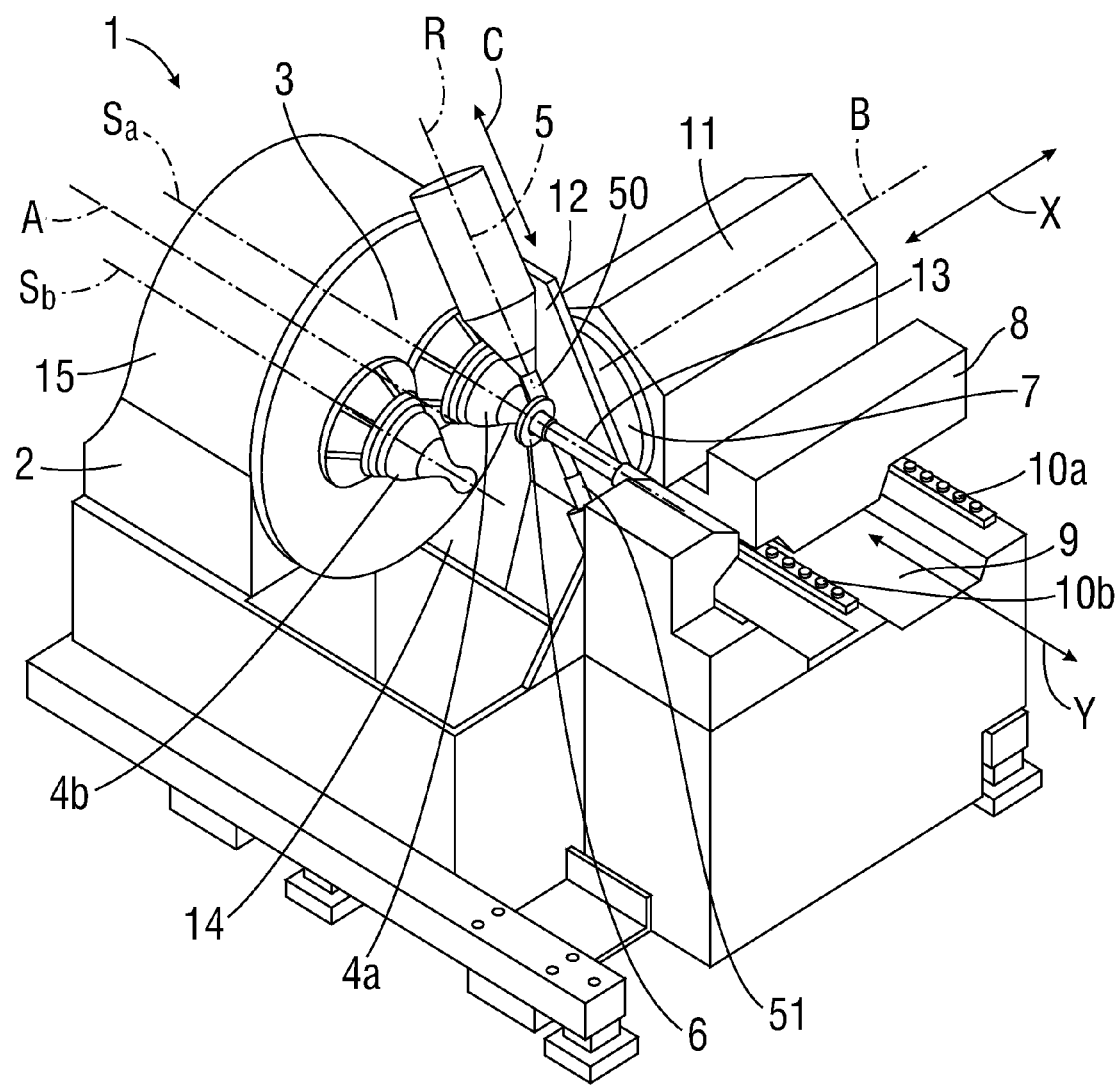
FIG. 1 illustrates an exemplary machine tool according to the invention for processing tooth formations of workpieces.

FIG. 1 is a schematic oblique view of a machine tool 1 having a housing 2. A rotary holder 3 is arranged on a rear portion of the housing 2 in the Figure, with the rotary holder 3 being in the form of a cylinder and being supported so as to be rotatable about a main axis A. A first workpiece spindle 4a and a second workpiece spindle 4b are arranged at an upper side of the rotary holder 3 directed towards the inner side of the machine tool 1. The workpiece spindles 4a and 4b project out of the cylinder-like rotary holder 3 and are orientated parallel with the main axis A. In other words, the first workpiece spindle 4a has a first spindle axis $S_a$ and the second workpiece spindle 4b has a second spindle axis $S_b$, with both spindle axes $S_a$ and $S_b$ extending parallel with the main axis A. The workpiece spindles 4a and 4b are arranged symmetrically on the rotary holder 3, in this instance point-symmetrically relative to the main axis A, whereby unbalances are substantially avoided when the workpiece spindles 4a and 4b are moved by the rotary holder 3 being rotated about the main axis A. The main axis A and consequently also the spindle axes $S_a$ and $S_b$ are orientated horizontally.

The rotary holder 3 and the workpiece spindles 4a and 4b are motor-driven. A processing position and a transfer position for the workpiece spindles 4a, 4b are fixed by two stops which are provided on the rotary holder 3. The two workpiece spindles 4a, 4b each change between the processing position and the transfer position by the rotary holder 3 being rotated. In the Figure, the first workpiece spindle 4a is at the processing position and the second workpiece spindle 4b is at the transfer position.

A substantially cylindrical tool holder 5, in which an elongate tool 50, for example, a gear hobber, is clamped or secured, is arranged beside the first workpiece spindle 4a. The tool 50 which is held in the tool holder 5 is stabilised in its position by a counter-bearing 51 which is secured at an opposite side of the housing 2. In the position illustrated, the tool 50 abuts a workpiece 6 which is arranged on the first workpiece spindle 4a. The tool 50 is able to be rotated about a tool rotation axis R in the tool holder 5, in particular by means of a motor.

Whilst the workpiece 6 is being processed in the processing position by means of the tool 50, the second workpiece spindle 4b is unloaded at the same time at the transfer position and is subsequently loaded with a new workpiece. Owing to the simultaneous parallel execution of method steps at two different workpiece spindles 4a and 4b in two spatially separate positions, the processing position and the transfer position, the overall processing cycle is reduced because the production time and the non-production time occur in a parallel manner.

The directly driven workpiece spindles 4a and 4b and the directly driven tool 50 allow a short processing time owing to high drive outputs and speeds, and consequently allow a high level of utilisation of the machine tool 1 to be achieved. It is possible to dispense with braking and/or slowing down the tool 50 or the tool holder 5 because the first workpiece spindle 4a is driven in a synchronised manner in terms of speed when it is introduced into the processing position, which results in further reduction in the processing cycle.

The tool holder 5 is arranged on a rotating holder 7 which can be rotated about a horizontal axis of rotation B. The tool holder 5 can further be displaced along a horizontal linear axis X which extends perpendicularly relative to the main axis A and along a horizontal linear axis Y which extends parallel with the main axis A. To this end, the entire tool holder arrangement is arranged on a planar carrier 8. The carrier 8 can be displaced along a travel path 9 on rails 10a and 1ob. The rails 10a and 1ob are orientated parallel with the main axis A. Movement of the tool holder 5 along the linear axis X is brought about in that the rotating holder 7 is arranged in an elongate rotating holder housing 11, with the rotating holder housing 11 being displaceable on the carrier 8 in the direction of the linear axis X. The linear axes X and Y are, similarly to the main axis A and the spindle axes $S_a$ and $S_b$, orientated horizontally. Consequently, it is possible to move the tool holder 5 relative to the workpiece 6 and the first workpiece spindle 4a by linear displacements or movements in a horizontal plane, which leads to a vertical lifting movement being dispensed with and consequently a simplified structure of the machine tool 1.

The tool holder 5 is further arranged on a substantially rectangular tool slide 12 and can be displaced therewith along a linear axis C relative to the rotating holder 7. The linear axis C is perpendicular relative to the axis of rotation B. Gear wheels having different profiles and numbers of teeth can be produced on the workpiece 6 owing to the directions of movement and degrees of freedom of the tool holder 5.

A counter-holder 13 which is arranged at a side of the housing 2 opposite the rotary holder 3 is arranged opposite the first workpiece spindle 4a. The counter-holder 13 is orientated along the first spindle axis $S_a$ and adjoins a tip of the first workpiece spindle 4a. In this manner, it stabilises the first workpiece spindle 4a in the processing position. Stabilising or locking the first workpiece spindle 4a in the processing position or corresponding release by means of the counter-holder 13 can be brought about by an electronic control unit of the counter-holder 13.

Chips which are produced when the workpiece 6 is processed by means of the machine tool 1 fall in a vertical direction downwards owing to gravitational force and are received at that location in a funnel-like chip collection device 14 which is provided in the housing 2. The chip collection device 14 which is located below the workpiece spindles 4a and 4b is readily accessible from outside. Owing to the chips being discharged or falling in a vertical direction, contact between chips and the rotary holder 3 and the workpiece spindles 4a and 4b and particularly the drives provided thereon is substantially prevented.

The loading and unloading of the second workpiece spindle 4b can be reduced by means of a clamping device. The production time, that is to say, the time for processing the workpiece 6 in the processing position, can further be used in order to subsequently process a workpiece, which has previously been processed at that location, in the transfer position. To that end, a deburring device which is preferably secured to an outer surface 15 of the rotary holder 3 is advantageous. A deburring device which is arranged at the outer surface 15 engages laterally, in particular from above, with a workpiece on the second workpiece spindle 4b and consequently does not impair the accessibility of the transfer position. The efficiency of the machine tool 1 is further increased by loading and unloading and deburring parallel with the production time.

Owing to a protective shield or a partition wall (not illustrated) between the workpiece spindles 4a, 4b arranged on the rotary holder 3, contact is prevented between chips which occur during the processing operation and non-processed workpieces and the corresponding workpiece spindles, and discharge of the chips into the chip collection device 14 is ensured.

Additional horizontal arrangements of two or more workpiece spindles on a horizontally orientated rotary holder are conceivable. According to the invention, three workpiece spindles can also in particular be arranged on a horizontally orientated rotary holder, for example, in a state distributed about the main axis A at angular intervals of 120° with the same radial spacing.

What is claimed is:

1. Machine tool for processing tooth formations of workpieces, comprising
 a rotary holder having a portion which can be rotated about a main axis (A),
 two workpiece spindles which are arranged on the rotary holder portion, with the workpiece spindles having rotary spindle axes (Sa, Sb) which are orientated parallel with the main axis (A), with the main axis (A) of the rotary holder extending horizontally, with the workpiece spindles being arranged symmetrically about the main axis (A), wherein the workpiece spindles are rotatable about the main axis (A) between a transfer position and a processing position,
 a tool holder for a hobbing tool for processing a workpiece on one of the workpiece spindles; and
 a deburring device secured to the rotary holder for processing a workpiece on the workpiece spindle which is at the transfer position and wherein the machine tool is in the form of a gear hobbing device.

2. Machine tool according to claim 1, wherein the tool holder is displaceable along a horizontal linear axis (X) which extends perpendicularly relative to the main axis (A) and along a horizontal linear axis (Y) which extends parallel with the main axis (A).

3. Machine tool according to claim 1 wherein the tool holder is arranged on a rotatable holder which is rotatable about a horizontal axis of rotation (B) which extends perpendicularly relative to the main axis (A).

4. Machine tool according to claim 3, wherein the tool holder is arranged on a tool carriage, with the tool carriage being movable relative to the rotatable holder along a linear axis (C) which is perpendicular relative to the horizontal axis of rotation (B) of the rotatable holder.

5. Machine tool according to claim 1 wherein the rotary holder portion is in the form of a cylinder with the workpiece spindles projecting out of the cylinder.

6. Machine tool according to claim 1 wherein the rotary holder has a first stop and a second stop, with a first one of the workpiece spindles being at the processing position and a second one of the workpiece spindles being at the transfer position at each stop.

7. Machine tool according to claim 1 wherein a motorized drive is provided on the rotary holder.

8. Machine tool according to claim 1 wherein motorized spindle drives are provided on the workpiece spindles.

9. Machine tool according to claim 1 further comprising a counter-holder which faces the workpiece spindle in the processing position with the counter-holder being programmable by means of a control processor.

10. Machine tool according to claim 1 further comprising a protective shield disposed on the rotary holder portion between the workpiece spindles.

11. Machine tool according to claim 10 wherein the main axis (A) extends through the protective shield.

12. Machine tool according claim 1 further comprising a device for loading and unloading a workpiece in and from, respectively, the workpiece spindle at the transfer position.

\* \* \* \* \*